(12) United States Patent
Howard

(10) Patent No.: US 11,068,578 B2
(45) Date of Patent: Jul. 20, 2021

(54) SUBTOKEN MANAGEMENT SYSTEM FOR CONNECTED DEVICES

(71) Applicant: VISA INTERNATIONAL SERVICE ASSOCIATION, San Francisco, CA (US)

(72) Inventor: Kelvan Howard, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 124 days.

(21) Appl. No.: 16/083,846

(22) PCT Filed: Jun. 3, 2016

(86) PCT No.: PCT/US2016/035820
§ 371 (c)(1),
(2) Date: Sep. 10, 2018

(87) PCT Pub. No.: WO2017/209767
PCT Pub. Date: Dec. 7, 2017

(65) Prior Publication Data
US 2019/0095607 A1    Mar. 28, 2019

(51) Int. Cl.
*H04L 29/06* (2006.01)
*G06F 21/41* (2013.01)
(Continued)

(52) U.S. Cl.
CPC .......... *G06F 21/41* (2013.01); *H04L 63/0853* (2013.01); *H04W 4/50* (2018.02);
(Continued)

(58) Field of Classification Search
CPC . H04W 5/40; G06F 21/41; G06F 8/65; H04L 63/0853; G06Q 20/045–0457;
(Continued)

(56) References Cited

U.S. PATENT DOCUMENTS

| 5,280,527 A | 1/1994 | Gullman |
| 5,613,012 A | 3/1997 | Hoffman |

(Continued)

FOREIGN PATENT DOCUMENTS

| CN | 103944730 | 7/2014 |
| CN | 104424566 | 3/2015 |

(Continued)

OTHER PUBLICATIONS

RU2018144220 , "Office Action", dated Dec. 12, 2019, 12 pages.
(Continued)

*Primary Examiner* — Matthew T Henning
(74) *Attorney, Agent, or Firm* — Kilpatrick Townsend & Stockton LLP

(57) ABSTRACT

A system for generating subtokens and/or sets of protocols to be provided to connected devices for use in subsequent transactions is disclosed. A mobile device identifies one or more connected devices via a discovery process. The mobile device may receive transaction information related to transactions to be conducted by the connected devices. The mobile device may, in some cases by communicating with a processing server, identify a parent token and/or a set of protocols related to the transaction information/connected device. The mobile device may subsequently generate a subtoken derived from the parent token based on the set of protocols. The subtoken and/or the set of protocols may be provided to a connected device, which may subsequently conduct a transaction using the subtoken and/or the set of protocols.

21 Claims, 6 Drawing Sheets

(51) Int. Cl.
*H04W 4/50* (2018.01)
*H04W 12/06* (2021.01)
*G06F 8/65* (2018.01)
*G06Q 20/38* (2012.01)

(52) U.S. Cl.
CPC .............. *H04W 12/068* (2021.01); *G06F 8/65* (2013.01); *G06Q 20/3821* (2013.01); *H04L 63/0876* (2013.01)

(58) Field of Classification Search
CPC ....... G06Q 20/308; G06Q 20/32–3278; G06Q 20/3821–38215
See application file for complete search history.

(56) References Cited

U.S. PATENT DOCUMENTS

| | | |
|---|---|---|
| 5,781,438 A | 7/1998 | Lee |
| 5,883,810 A | 3/1999 | Franklin |
| 5,930,767 A | 7/1999 | Reber |
| 5,953,710 A | 9/1999 | Fleming |
| 5,956,699 A | 9/1999 | Wong |
| 6,000,832 A | 12/1999 | Franklin |
| 6,014,635 A | 1/2000 | Harris |
| 6,044,360 A | 3/2000 | Picciallo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem Ur |
| 6,453,301 B1 | 9/2002 | Niwa |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,132,723 B2 | 3/2012 | Hogg et al. |
| 8,171,525 B1 | 5/2012 | Pelly |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |

(56) References Cited

U.S. PATENT DOCUMENTS

| | | |
|---|---|---|
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,528,067 B2 | 9/2013 | Hurry et al. |
| 8,533,116 B2 | 9/2013 | Davis et al. |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,751,642 B2 | 6/2014 | Vargas |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,646,303 B2 | 5/2017 | Karpenko |
| 9,680,942 B2 | 6/2017 | Dimmick |
| 10,210,498 B1* | 2/2019 | Meyyappan ............ G06Q 10/20 |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0236632 A1 | 11/2004 | Maritzen |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0154925 A1 | 7/2005 | Chitrapu et al. |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0038525 A1 | 2/2007 | Waldvogel et al. |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |

(56) References Cited

U.S. PATENT DOCUMENTS

| | | |
|---|---|---|
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0004916 A1 | 1/2011 | Schiffman et al. |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143754 A1 | 6/2012 | Patel |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0018849 A1 | 1/2013 | Johnston et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173474 A1* | 7/2013 | Ranganathan ....... G06Q 20/401 705/67 |
| 2013/0173736 A1 | 7/2013 | Krzeminski |
| 2013/0174244 A1 | 7/2013 | Taveau et al. |
| 2013/0185202 A1 | 7/2013 | Goldthwaite |
| 2013/0191227 A1 | 7/2013 | Pasa et al. |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226802 A1 | 8/2013 | Hammad |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |

(56) References Cited

U.S. PATENT DOCUMENTS

| | | |
|---|---|---|
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon |
| 2014/0007076 A1* | 1/2014 | Kim ............ H04W 4/70 717/173 |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046848 A1* | 2/2014 | Radu ............ G06Q 20/405 705/44 |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0244834 A1* | 8/2014 | Guedalia ............ H04W 4/08 709/224 |
| 2014/0249945 A1 | 9/2014 | Gauthier |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0003386 A1 | 1/2015 | Sun |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0033286 A1 | 1/2015 | Shahidzadeh et al. |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0074787 A1 | 3/2015 | Ge et al. |
| 2015/0081544 A1 | 3/2015 | Wong et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0254665 A1 | 9/2015 | Bondesen et al. |
| 2015/0269566 A1 | 9/2015 | Gaddam et al. |
| 2015/0278799 A1 | 10/2015 | Palanisamy |
| 2015/0278810 A1* | 10/2015 | Ramatchandirane ............ G06Q 20/401 705/16 |
| 2015/0287037 A1 | 10/2015 | Salmon |
| 2015/0312038 A1 | 10/2015 | Palanisamy |
| 2015/0319158 A1 | 11/2015 | Kumnick |
| 2015/0324736 A1 | 11/2015 | Sheets |
| 2015/0332262 A1 | 11/2015 | Lingappa |
| 2015/0347114 A1* | 12/2015 | Yoon ............ H04L 12/2832 235/375 |
| 2015/0356560 A1 | 12/2015 | Shastry et al. |
| 2015/0363781 A1 | 12/2015 | Badenhorst |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0092874 A1 | 3/2016 | O'Regan |
| 2016/0103675 A1 | 4/2016 | Aabye et al. |
| 2016/0119296 A1 | 4/2016 | Laxminarayanan et al. |
| 2016/0132878 A1 | 5/2016 | O'Regan |
| 2016/0140526 A1* | 5/2016 | Cummins ............ G06Q 20/308 705/28 |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1* | 6/2016 | Prakash ............ G06Q 20/3226 705/44 |
| 2016/0173483 A1 | 6/2016 | Wong et al. |
| 2016/0197725 A1 | 7/2016 | Hammad |
| 2016/0210628 A1 | 7/2016 | McGuire |
| 2016/0217461 A1 | 7/2016 | Gaddam |
| 2016/0218875 A1 | 7/2016 | Le Saint et al. |
| 2016/0224976 A1 | 8/2016 | Basu |
| 2016/0224977 A1 | 8/2016 | Sabba et al. |
| 2016/0232527 A1 | 8/2016 | Patterson |
| 2016/0239842 A1 | 8/2016 | Cash et al. |
| 2016/0269391 A1 | 9/2016 | Gaddam et al. |
| 2016/0308995 A1 | 10/2016 | Youdale et al. |
| 2016/0345176 A1* | 11/2016 | DeWitt ............ H04W 4/12 |
| 2017/0046492 A1 | 2/2017 | Powell et al. |
| 2017/0076288 A1 | 3/2017 | Awasthi |
| 2017/0103387 A1 | 4/2017 | Weber |
| 2017/0109745 A1 | 4/2017 | Al-Bedaiwi |
| 2017/0148013 A1 | 5/2017 | Rajurkar |
| 2017/0163617 A1 | 6/2017 | Narayan |
| 2017/0163629 A1 | 6/2017 | Law |
| 2017/0186001 A1 | 6/2017 | Reed et al. |
| 2017/0200156 A1 | 7/2017 | Karpenko |
| 2017/0200165 A1 | 7/2017 | Narayan |
| 2017/0201520 A1 | 7/2017 | Chandoor |
| 2017/0220818 A1 | 8/2017 | Nagasundaram et al. |
| 2017/0221054 A1 | 8/2017 | Flurscheim |
| 2017/0221056 A1 | 8/2017 | Karpenko |
| 2017/0228723 A1 | 8/2017 | Taylor |
| 2017/0228728 A1 | 8/2017 | Sullivan |

(56) References Cited

U.S. PATENT DOCUMENTS

| | | |
|---|---|---|
| 2017/0236113 A1 | 8/2017 | Chitalia |
| 2017/0293914 A1 | 10/2017 | Girish |
| 2017/0295155 A1 | 10/2017 | Wong et al. |
| 2017/0337549 A1 | 11/2017 | Wong |
| 2017/0364903 A1 | 12/2017 | Lopez |
| 2017/0364914 A1 | 12/2017 | Howard |
| 2017/0373852 A1 | 12/2017 | Cassin |
| 2018/0004930 A1* | 1/2018 | Csinger ............... H04L 9/3234 |
| 2018/0006821 A1 | 1/2018 | Kinagi |
| 2018/0075081 A1 | 3/2018 | Chipman |
| 2018/0247303 A1 | 8/2018 | Raj |
| 2018/0262334 A1 | 9/2018 | Hammad |
| 2018/0268399 A1 | 9/2018 | Spector |
| 2018/0268405 A1 | 9/2018 | Lopez |
| 2018/0285875 A1 | 10/2018 | Law |
| 2018/0324184 A1 | 11/2018 | Kaja |
| 2018/0324584 A1 | 11/2018 | Lopez |
| 2019/0020478 A1 | 1/2019 | Girish |
| 2019/0066069 A1 | 2/2019 | Faith |
| 2019/0147439 A1 | 5/2019 | Wang |
| 2019/0356489 A1 | 11/2019 | Palanisamy |
| 2019/0384896 A1 | 12/2019 | Jones |
| 2019/0392431 A1 | 12/2019 | Chitalia |
| 2020/0267153 A1 | 8/2020 | Kang |

FOREIGN PATENT DOCUMENTS

| | | |
|---|---|---|
| CN | 104641345 | 3/2015 |
| CN | 104850994 | 8/2015 |
| EP | 1028401 A2 | 8/2000 |
| EP | 2156397 A1 | 2/2010 |
| JP | 2002032692 | 1/2002 |
| JP | 2003097884 | 4/2003 |
| JP | 2004258739 | 9/2004 |
| JP | 2007529167 | 10/2007 |
| JP | 2007304806 | 11/2007 |
| JP | 2014056456 | 3/2014 |
| JP | 2015512068 | 4/2015 |
| JP | 2017514197 | 6/2017 |
| KR | 20110002810 | 1/2011 |
| RU | 2571721 | 12/2015 |
| WO | 2000/014648 A1 | 3/2000 |
| WO | 2001035304 A1 | 5/2001 |
| WO | 2001035304 A9 | 5/2001 |
| WO | 2004/051585 A2 | 11/2003 |
| WO | 2004042536 A2 | 5/2004 |
| WO | 2005/001751 A1 | 6/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |
| WO | 2015123678 | 8/2015 |

OTHER PUBLICATIONS

EP16904219.9 , "Extended European Search Report", dated Feb. 25, 2019, 7 pages.
EP16904219.9 , "Office Action", dated Jan. 22, 2020, 7 pages.
JP2018-562016 , "Office Action", dated Jan. 8, 2020, 7 pages.
PCT/US2016/035820 , "International Search Report and Written Opinion", dated Feb. 16, 2017, 14 pages.
Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.
Dean, et al., U.S. Appl. No. 16/311,144 (unpublished), "Encryption Key Exchange Process Using Access Device," filed Dec. 18, 2018.
Application No. CN201680086290.3 , Office Action, dated Dec. 2, 2020, 19 pages.
Application No. EP16904219.9, EP Communication under Rule 71(3), dated Dec. 1, 2020, 54 pages.
AU2016409079 , "First Examination Report", dated Feb. 25, 2021, 5 pages.

* cited by examiner as# SUBTOKEN MANAGEMENT SYSTEM FOR CONNECTED DEVICES

CROSS REFERENCE TO RELATED APPLICATIONS

This application is the US national stage of PCT/US2016/035820, filed Jun. 3, 2016, the disclosure of which is incorporated herein by reference in its entirety.

BACKGROUND

Households typically include a number of connected devices and these connected devices have needs to access resources such as goods, services, and data. For example, consumers have refrigerators for storing food, gas meters for measuring gas usage, electric meters for measuring power usage, and water meters for measuring water usage. Recently, "smart" versions of some of these connected devices have been introduced to the public. It has been contemplated that such smart connected devices could be capable of automatically requesting resources such as software updates, goods or services. However, each time a connected device initiates a transaction (usually over a wireless area network) there is a chance that details of the transaction (including payment account information) and/or sensitive credential information associated with the connected device may be intercepted and the owner of the device may be defrauded. Given the proliferation of network enabled connected devices, it is difficult to provide data security to each and every interaction between each and every connected device within system.

Embodiments of the invention address these and other problems, individually and collectively.

BRIEF SUMMARY

Embodiments of the invention can be applied to the "Internet of things" where machines can interact with other machines without human intervention. In particular, embodiments of the invention are directed to a system in which a mobile device generates subtokens and/or a set of protocols to be provided to (or provisioned onto) one or more connected devices to be used in at least one subsequent transaction conducted by the connected devices. In some embodiments, a subtoken may be generated from a parent token stored on a mobile device, such that it is associated with an underlying account of the parent token, but is of limited duration. In some embodiments, the set of protocols may dictate the conditions under which the subtoken may be used.

One embodiment of the invention is directed to a method comprising connecting, by a mobile device, to a private network and identifying a plurality of connected devices connected to the private network. The method further comprises receiving, from the plurality of connected devices, information related to transactions requested by the plurality of connected devices and, in response to receiving the information, providing subtokens to each connected device of the plurality of connected devices associated with the transactions, each of the subtokens being derived from a parent token and being useable to initiate at least one transaction in the transactions, wherein the subtokens are subsequently used by the connected devices to conduct the transactions.

Another embodiment of the invention is directed to a mobile device comprising a processor, one or more short range communication means, and a memory including instructions that, when executed with the processor, cause the mobile device to connect to a private network, and identify a plurality of connected devices in communication with the private network. The instructions further cause the mobile device to receive, from the plurality of connected devices, information related to transactions to be conducted by the plurality of connected devices and provide, to each connected device of the plurality of connected devices, a subtoken derived from a parent token useable to initiate at least one transaction in the transactions to be conducted by the plurality of connected devices.

Another embodiment of the invention is directed to a connected device comprising one or more processors, and a memory including instructions that, when executed by the one or more processors, cause the connected device to connect to a private network and establish, via the private network, a communication session with a mobile device. The instructions further cause the connected device to provide, to the mobile device via the communication session, an indication of at least one transaction to be conducted in relation to a resource managed by the connected device. The instructions further cause the connected device to receive, from the mobile device via the communication session, a subtoken useable to conduct the at least one transaction, and initiate, using the received subtoken, the at least one transaction.

These and other embodiments of the invention are described in further detail below.

DETAILED DESCRIPTION

Figure 1:
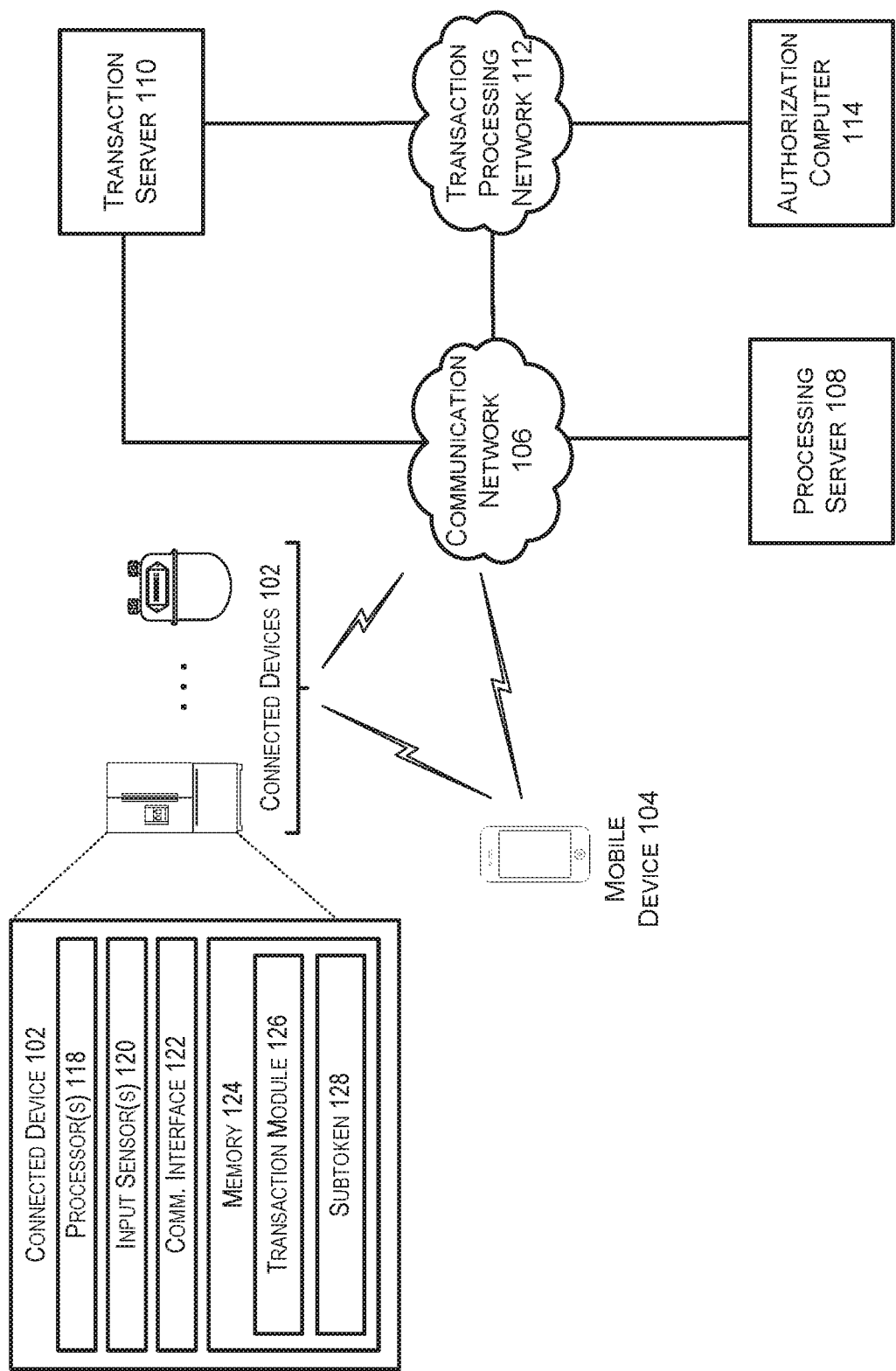
FIG. 1 depicts an example system architecture capable of implementing at least some embodiments of the current disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

An "access credential" may be any data or portion of data used to gain access to a particular resource. In some embodiments, an access credential may be a login and/or password for a user account. In some embodiments, an access credential may be include account information or a token associated with the account information, a cryptogram, a digital certificate, etc. A mobile device may store one or more access credentials associated with each connected device. In some embodiments, an access credential stored in association with a connected device may be used to conduct transactions on behalf of the connected device. In some embodiments, the mobile device may store a single access credential that may be used in each transaction initiated by the mobile device.

"Account data" may refer to any content of an account of a user conducting a transaction. In some embodiments, account data may be payment account data that may be utilized to make a purchase. In other embodiments, account data may be any content associated with a user's non-financial account. For example, account data may include electronic files, photos, videos, and documents stored by the user's account. In some embodiments, account data may be stored by an authorization computer.

"Account information" may refer to any information surrounding an account of a user. For example, account information may include account data and one or more account identifiers. In some embodiments, the account identifier may be a PAN or primary account number. The PAN may be 14, 16, or 18 digits. Account information may also include an expiration date associated with the account, as well as a service code and/or verification values (e.g., CVV, CVV2, dCVV, and dCVV2 values).

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

A "communication device" may be any electronic device that has a primary function related to communication. A communication device may be capable of establishing a communication session with another electronic device and transmitting/receiving data from that device. In some embodiments, a communication device may act as a proxy device between two or more other electronic devices by establishing communication sessions with each of the devices and relaying information between the devices. A mobile device may be a type of communication device.

A "connected device" may be any suitable electronic device capable of communicating with, and/or interacting with other devices. A connected device may have a primary function that is unrelated to communicating with other electronic devices. For example, a connected device may be a refrigerator that, in addition to preserving food, is capable of interacting with one or more other electronic devices. In some embodiments, a connected device may be associated with a device identifier. The device identifier may be used by a service provider to determine the type of device for a particular connected device. Examples of connected devices may include gas and electric meters, refrigerators, lamps, thermostats, printers, automobiles, fire alarms, home medical devices, home alarms, motorcycles, boats, televisions, etc. A connected device need not be "connected" at all times, as the term connected is intended to refer to devices with the ability to establish a connection with another device.

A "device identifier" may include any suitable distinctive set of characters used to identify a device. An exemplary device identifier may include any suitable number or type of characters (e.g., numbers, graphics, symbols, or other information) that may uniquely represent a device. By way of example, a device identifier may be a serial number, partial serial number, or device name or nickname. In some embodiments, a device identifier may be generated, based on a trusted hardware root. Additionally, the device identifier may be a temporary identifier for a particular device, such as a network address at which the device may be found.

An "electronic device," may be any device that accomplishes its purpose electronically. An electronic device may have multiple functions. For example an electronic device may have a primary function and one or more secondary functions. A primary function may be the function that most closely aligns with the electronic device's purpose. An example of an electronic device may be a connected device.

An "issuer" may typically refer to a business entity (e.g., a bank) that maintains an account for a user that is associated with a portable communication device such as an account enrolled in a mobile application installed on a portable communication device. An issuer may also issue account parameters associated with the account to a portable communication device. An issuer may be associated with a host system that performs some or all of the functions of the issuer on behalf of the issuer.

A "merchant" may typically be an entity that engages in transactions and can sell goods or services, or provide access to goods or services.

A "private network" may be any communication network not readily accessible by the public. In some embodiments, a private network may be secured by a password or encryption protocol. In some embodiments, a private network may be accessed by multiple electronic devices by connecting to a wireless router. By way of example, a private network may be a home network useable by the residents of the home or a business network useable by the employees of the business.

A "protocol set" may be a set of rules or configuration settings that indicates one or more actions are allowed and/or should be performed. In some cases, a protocol set may include conditions upon which those actions are to be performed. In some embodiments, a protocol set may include conditional statements, such as "if x_condition occurs, then perform y_action." In some embodiments, a protocol set may include a list of transactions that are allowed for a particular connected device and/or access credential. For example, a mobile device may identify, based on a device identifier, a type of device that the protocol set is related to. The mobile device may then create a custom protocol set for that connected device based on the device's type. For example, upon determining that a connected device is a water meter, the mobile device may create a protocol set for the water meter that only allows it to conduct transactions related to water usage. In this example, the protocol set may be stored at the mobile device in relation to the water meter (or an access credential associated with the water meter) and at least a portion of the protocol set may be provisioned onto the water meter. In some embodiments, protocols may be stored on a processing server. Upon discovery of a connected device by the mobile device, the processing server may identify the protocol set relevant to the connected device and transmit that protocol set to the mobile device.

A "processing server" may be any computing device configured to provide remote support for a mobile device. The processing server may provide any suitable service and/or processing for the mobile device. In some embodiments, the processing server may maintain an account for one or more users. The processing server may also store one or more protocols and/or user preferences related to the operation of the mobile device or service.

A "mobile device" may be any computing device capable of traveling with a user. In some embodiments, a mobile device can include any suitable computing device configured to establish communication sessions with one or more connected devices and a transaction server (either directly or via a processing server) and (in some cases) to initiate transactions with the transaction server on behalf of the connected devices. In some embodiments, the mobile device may store one or more access credentials to be used in these transactions. In some embodiments, the mobile device may be configured to store one or more protocol sets related to transactions and/or connected devices. The mobile device may be further configured to confirm that transactions are in compliance with these transaction protocols prior to initiating the transactions.

The term "provisioning" may include any preparation and/or configuring of a device to enable it to perform a function. For example, provisioning may include storing rules, protocols, and/or instructions on a device to direct the device's actions. In some embodiments, a device may be provisioned with access credentials associated with a user of the device. The access credentials may enable the device to execute transactions on the users behalf without active input from the user.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "token" may be a substitute for a real credential. In some embodiments, a token may include an identifier for a payment account that is a substitute for a real credential such as primary account number (PAN). For example, a token may include a series of numeric and/or alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. In other embodiments, a token may be mathematically derived (e.g., with an encryption key) from the real credential. Further, in some embodiments, the token format may be configured to allow the entity receiving the token to identify it as a token and recognize the entity that issued the token. A token may be associated with a protocol set. Tokens may include parent tokens and subtokens. Although the use of payment tokens and payment subtokens are described in detail, embodiments of the invention are not limited thereto. For example, instead of subtokens that are used for payment, embodiments of the invention may include subtokens that can be used to access data.

A "parent token" can be a token which is directly derived or obtained from real credential (e.g., a PAN). For example, a parent token "4900 0000 0000 0001" may be used in place of a real PAN "4147 0900 0000 1234."

A "subtoken" may a token that is derived or obtained from a parent token. If the subtoken is used for payment, the subtoken may be subordinate to the parent token in that funds for the subtoken may be obtained from an account associated with the parent token and/or the real credential associated with the parent token. The subtoken may be computationally derivable from the parent token or may not be computationally derivable from the parent token. Further, the subtoken may have the same or different form or format as the parent token. For example, the subtoken and the parent token may each be format preserving and may be 16, 18, or 19 digits in length. Further, many subtokens may be associated with a single parent token in some embodiments of the invention. For example, separate subtokens may be generated from a single parent token for a plurality of connected devices, wherein each connected device is provided with a subtoken that may only be used by that connected device.

A "transaction server" may include any computing device capable of receiving a request for a transaction and processing information related to the requested transaction. In some embodiments, the transaction server may be affiliated with an electronic marketplace or a retail entity that maintains an internet presence. A transaction server may support transactions to acquire resources (e.g., goods and/or services). In some embodiments, a user may request a transaction by visiting a website affiliated with the transaction server and selecting one or more items to purchase. The transaction server may be in communication with other devices via a network connection.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

Details of some embodiments of the present invention will now be described.

FIG. 1 depicts an example system architecture capable of implementing at least some embodiments of the current disclosure. In FIG. 1, one or more connected devices 102 may be in communication with a mobile device 104. The connected devices 102 may be located within a vicinity of the mobile device 104. For example, the connected devices 102 may be within range of a short range communication means used by the mobile device 104. In some embodiments, the range may be less than about 100, 50, 20, 10, or 5 yards. In some embodiments, the connected devices 102 may be connected to a communication network 106. For example, the connected devices 102 may each be in communication with a private communication network.

In some embodiments, the mobile device 104 may be in communication with a processing server 108 via a communication network 106. The processing server 108 and/or the mobile device 104 may also be in communication with a transaction server 110 configured to receive and process transaction requests. Upon receiving a transaction request, the transaction server 110 may generate and submit an authorization request to a transaction processing network 112 to be authorized by an authorization computer 114.

The connected device 102 may be any electronic device configured to perform at least one primary function. The connected device 102 may include one or more processors 118 capable of processing user input. The connected device 102 may also include one or more input sensors 120 for collecting input. In some embodiments, the input may include user provided input. Some non-limiting examples of input sensors 120 that may be included in a connected device include keyboards, mice, microphones, cameras, motion sensors, accelerometers, cameras, pressure sensors, thermometers, a global positioning system (GPS), etc. In some embodiments, the input may include input related to resource usage. For example, the connected device may be a water meter configured to capture input related to water usage at a particular location. In another example, the connected device may be an electricity meter configured to capture input related to electricity usage at a particular location.

In some embodiments, the connected device 102 may include a communication interface 122 configured to enable communication between the connected device 102 and another electronic device (e.g., mobile device 104, or a wireless router that manages access to communication network 106). Examples of communication interface 122 may include one or more radio frequency (RF) transceivers configured to send and receive communications using near-field communications (NFC), or other radio frequency or wireless communication protocols such as Bluetooth, Bluetooth low-energy (BLE), a wireless local area network (e.g., WiFi), iBeacon, etc. In some embodiments, communication interface 122 may include an infrared communication device. In some embodiments, the communication interface 122 may include both long range and short range communication means. For example, the communication interface may include an antenna configured to connect to a cellular network in order to enable communication with various other components of the depicted architecture.

In some embodiments, the communication technology used by the connected device 102 and/or the mobile device 104 may depend on the type of power source used by the connected device. For example, if the device has access to a regular, external power supply (e.g., as is common for smart refrigerators and other devices such as washer/driers, garage doors, cars, etc.) it may include a WiFi interface. Alternatively, if the device relies on a battery instead of an external power supply, it may include a means for communication that consumes less power, such as low power Bluetooth interface, a ZigBee interface, a near field communication (NFC) or radio frequency (RF) interface, or any other suitable wireless access interface.

Embodiments of one or more modules on the connected device 102 may be stored and executed from its memory 124. Turning to the contents of the memory 124 in more detail, the memory 126 may include an operating system and one or more modules configured to cause the processors 118 to carry out instructions in accordance with at least some embodiments of the disclosure. For example, the memory 124 may include a transaction module 126 configured to work with the processor 118 to initiate one or more transactions related to the primary function of the connected device 102. Additionally, the memory 124 may include information related to one or more access credentials (subtoken 128).

In some embodiments, the transaction module 126 may be programmed to cause the connected device 102 to initiate a transaction on behalf of an owner and/or operator of the connected device 102. For example, the transaction module 126 may be configured to cause the connected device 102 to initiate a purchase of a resource on behalf of the user. The resource may be any good or service related to a primary function of the electronic device. For example, a water purifier may initiate a purchase order for new water filters upon determining that the current water filters need replacement. The transaction module 126 may be programmed to cause the connected device 102 to provide one or more transaction details to the mobile device 104. For example, upon detecting that a mobile device 104 is present (e.g., the mobile device 104 may connect to a private network), the transaction module 126 may provide transaction details to the mobile device in order to receive a subtoken to be used to conduct the transaction. In some embodiments, the transaction module may be programmed to cause the connected device 102 to initiate a transaction upon determining that one or more threshold conditions have been met. Threshold conditions may be preset (e.g., programmed by the manufacturer or distributor of the connected device) or provided by a user of the connected device 102. In some embodiments, the threshold conditions may be provisioned onto the connected device 102 by the mobile device 104.

The memory 124 of connected device 102 may include a secure execution environment such as a secure memory (e.g., Smartcard based technology available in low-power devices). In some embodiments, the secure memory may include a secure element. A secure element (SE) can be a tamper-resistant platform (typically a one chip secure microcontroller) capable of securely hosting applications and their confidential and cryptographic data (e.g. key management) in accordance with the rules and security requirements set forth by a set of well-identified trusted authorities. Sensitive information (e.g., a subtoken 128 or other suitable access credential data) provisioned onto the connected device 102 may be stored in the secure memory.

In at least some embodiments of the invention, a mobile device 104 may be configured to detect local connected devices 102. For example, the mobile device 104 may be configured to perform a device discovery action that identifies all communicatively enabled electronic devices within range of the mobile device 104. By way of illustration, a mobile device 104 may detect all electronic devices that are connected to WiFi within range of the mobile device 104. In another example, the mobile device 104 may connect to a private network (e.g., a home-based or business-based network) and may identify each of the connected devices 102 that are also connected to the private network. Once detected, the mobile device 104 may receive a selection of at least one of the connected devices from a user. In some embodiments of the disclosure, the mobile device 104 may establish a connection with the selected connected device and receive information related to the connected device (e.g., a device identifier). In some embodiments, an additional step of authenticating that a user owns the connected device may be required by the mobile device in order to establish a connection. For example, the user may be required to enter a password for the connected device or press a button located on the connected device. Information related to the connected device may be presented to a user within a graphical user interface (GUI) executed from the mobile device 104. In some embodiments, the mobile device 104 may authenticate the connected device 102 by use of a shared secret or digital signature. For example, upon encountering a new connected device 102, the mobile device 104 may, upon determining that the connected device 102 is authorized to receive a subtoken (e.g., by confirming shared ownership by the user as described above), provide an encryption key and/or passcode to the connected device 102. Upon establishing a communication session with the mobile device 104 in the future, the connected device 102 may authenticate itself by providing the passcode to the mobile device 104.

The mobile device 104 may also establish a connection with a processing server 108 that provides back end support for the mobile device 104 by maintaining and managing transaction-related activities. In some embodiments, upon selection of the connected device by the user, the mobile device 104 may transmit information related to the connected device 102 to the processing server 108. The processing server 108 may retrieve transaction processing information to be associated with the connected device and may send that transaction processing information to the mobile device 104. In this way, the transaction processing information may be provisioned onto the mobile device 104 for a particular connected device 102. The transaction processing information may include an access credential, consumer identifier, protocol information and/or any other suitable information relevant to the connected device.

The processing server 108 may be any type of computing device, including a remotely located server computer, configured to perform one or more actions on behalf of the mobile device 104. Additionally, it should be noted that in some embodiments, the processing server 108 may be embodied by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment. In some embodiments, the processing server 108 may be configured to provide information related to one or more connected devices 102 to the mobile device 104. In some embodiments, a processing server may be a mobile application server that supports a mobile application installed on, and executed from, the mobile device 104. In some embodiments, the processing server may be a server that supports mobile payment applications. For example, an e-wallet application may be installed on the mobile device 104. In this example, payment information may be maintained by the processing server.

In some examples, the communication network 106 and/or the transaction processing network 112 may include any one or a combination of many different types of networks, such as cable networks, the Internet, wireless networks, cellular networks, and other private and/or public networks. In addition, the communication network 106 and/or transaction processing network 112 may comprise multiple different networks. For example, the mobile device 104 may utilize a 3G network to communicate with a wireless router, which may then route the communication over a public network (e.g., the Internet) to the processing server 108. In some embodiments, the transaction processing network 112 may be an electronic payment network (e.g., VisaNet).

Transaction server 110 may be any computing device or plurality of computing devices configured to receive a transaction request and initiate a transaction. In some embodiments, the transaction server 110 may be associated with an electronic commerce site. For example, the transaction server may maintain a catalog of items and/or services available for purchase. The transaction server may also be associated with a utility company or other resource provider. In some embodiments, the transaction server may enable a user to pay a bill or other outstanding debt related to resource acquisition. The transaction server 110 may also be configured to complete a transaction upon receiving an authorization response message indicating that a transaction has been approved.

In some embodiments, the transaction server 110 may be in communication with an acquirer computer. An acquirer computer may be any computing device or plurality of computing devices configured to process transaction information received from the transaction server 110 and generate an authorization request message to be transmitted to the authorization computer 114. In some embodiments, the acquirer computer may be owned and/or operated by a banking institute with which the operator of the transaction server 110 maintains an account.

Authorization computer 114 may be any computing device or plurality of computing devices configured to receive an authorization request message for a transaction, authorize or decline the transaction, and provide an authorization response message based on whether the transaction has been authorized or declined. The authorization computer 114 may determine whether to authorize or decline the transaction based on information associated with the transaction. In some embodiments, the authorization computer 114 may be an issuer of a payment account (e.g., a credit card).

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications protocol.

Figure 2:
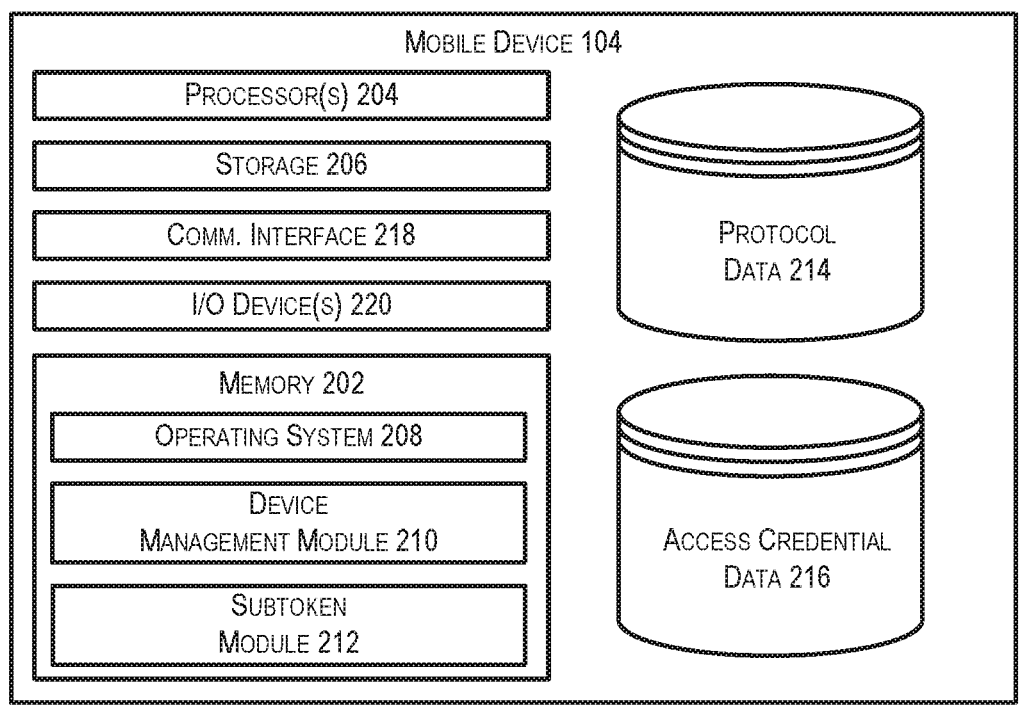
FIG. 2 depicts an example mobile device configured to store and manage access credentials and provide transaction related information to connected devices in accordance with at least some embodiments.

FIG. 2 depicts an example mobile device configured to store and manage access credentials and provide transaction related information to connected devices in accordance with at least some embodiments. The depicted mobile device may be an example mobile device 104 of FIG. 1.

The mobile device 104 may be any type of computing device capable of interacting with one or more connected devices. In some embodiments, the mobile device 104 may be a mobile phone or any other suitable portable electronic device. In at least some embodiments, the mobile device 104 may include at least one memory 202 and one or more processing units (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202 may store program instructions that are loadable and executable on the processor(s) 204, as well as data generated during the execution of these program instructions. Depending on the configuration and type of mobile device 104, the memory 202 may be volatile (such as random access memory (RAM)) and/or non-volatile (such as read-only memory (ROM), flash memory, etc.). The mobile device 104 may also include additional storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the mobile device. In some embodiments, the memory 202 may include multiple different types of memory, such as static random access memory (SRAM), dynamic random access memory (DRAM) or ROM.

The memory 202 of mobile device 104 may include a secure execution environment such as a secure memory (e.g., Smartcard based technology available in low-power devices). In some embodiments, the secure memory may include a secure element. A secure element (SE) can be a tamper-resistant platform (typically a one chip secure microcontroller) capable of securely hosting applications and their confidential and cryptographic data (e.g. key management) in accordance with the rules and security requirements set forth by a set of well-identified trusted authorities. In some embodiments, a token or other access credential data may be stored in the secure execution environment.

Information provisioned by a processing server onto the mobile device 104 may be stored in the secure memory. The mobile device 104 may include secure key storage to protect data at rest and encryption keys (i.e. a shared secret). The encryption keys could be unique-derived keys (UDKs), which can be derived from user account information and other unique information. A benefit to using UDKs is that the UDKs do not need to be transported to the devices that use them, but they can be generated by those devices using information known to those devices. The mobile device 104 may also store instructions for communicating with other devices and/or instructions for initiating a payment transaction.

Turning to the contents of the memory 202 in more detail, the memory 202 may include an operating system 208 and one or more application programs or services for implementing the features disclosed herein including at least a module for managing access credentials (e.g., real credentials, parent tokens and subtokens) and transaction protocols associated with a connected device (device management module 210) and/or a module for generating or obtaining (e.g., retrieving) subtokens in accordance with transaction data (subtoken module 212). The memory 202 may also include protocol data 214, which provides data associated with one or more transaction protocols and access credential data 216, which provides information on access credentials for one or more connected devices.

In some embodiments, the device management module 210 may, in conjunction with the processor 204, be configured to manage access credentials and transaction protocols associated with a connected device. In some embodiments, the device management module may be configured to cause the mobile device 104 to identify one or more relevant connected devices. For example, upon connecting to a private network, the mobile device may aggregate a set of identifiers for connected devices currently connected to the private network. The identifiers for the devices could include device serial numbers, device network addresses, etc. In some embodiments, the mobile device 104 may query a datastore. The query may include device identifiers (e.g., protocol data 214), and these device identifiers may be queried against a set of stored identifiers to determine if the mobile device has previously encountered the connected devices. The device management module 210 may cause the mobile device 104 to, upon detecting a new connected device, contact a processing server to receive protocol data relevant to the new connected device. For example, upon establishing a communication session between a mobile device 104 and a private network, the mobile device 104 may detect a smart refrigerator that is also connected to the private network. The mobile device may attempt to retrieve protocol data (e.g., rules regarding what types of transactions can be conducted, what type of authentication data is needed, etc.) related to the smart refrigerator from protocol database 214. Upon determining that no protocols exist, the mobile device 104 may determine that the smart refrigerator has not previously been encountered. In this example, the device management module 210 may cause the mobile device to establish a communication session with a processing server. The mobile device may provide the processing server, via the communication session, with the device identifier for the smart refrigerator. The processing server may subsequently identify one or more protocols relevant to the smart refrigerator to be provisioned onto the mobile device 104. In some embodiments, relevant protocols may be identified based on a type or category of connected device (e.g., refrigerator), a brand of connected device, user specifications, or any other suitable information.

In some embodiments, the subtoken module 212 may, in conjunction with the processor 204, be configured to generate subtokens in accordance with transaction data and relevant protocol information. A subtoken may be derived from a parent token useable to conduct a transaction. For example, the mobile device 104 may store and manage information related to one or more tokens in access credential data 216. Upon determining that a connected device should be provided with a subtoken, the subtoken generation module may cause the processors 204 to identify an appropriate token in access credential data 216 and generate a subtoken derived from that token. An exemplary subtoken may reference the same underlying account information as the parent token from which it is derived, but may be of limited duration or use. For example, the subtoken may be single-use, in that it is invalidated immediately after use. In another example, the subtoken may be associated with an expiration date, after which the subtoken is invalidated (e.g., will not be allowed to be used by the transaction processing system). In another example, the subtoken may only be useable for a particular type of transaction or by a particular connected device. In some embodiments, the subtoken module 212 may cause the mobile device 104 to provide the subtoken to a processing server, where it may be stored. In other embodiments, the subtoken module 212 could retrieve subtokens from external sources and need not generate them.

Once subtokens are generated or obtained by the mobile device 104, a record of the subtoken generation and/or the subtokens themselves may be transmitted to a remotely located token server so that the token server is able to approve transaction requests using the subtoken. In other embodiments, if the subtokens are mathematically derivable (e.g., using encryption keys or shared secrets), then the raw data to calculate the corresponding subtoken may be transmitted to the token server.

One or more of the device management module 210 and/or the subtoken module 212 may in conjunction with the processor(s) 118 cause the mobile device 104 to establish a communication session with a detected connected device. The mobile device may provision the connected device, via the established communication session, with one or both of a subtoken generated by the subtoken module 212 and a set of protocols relevant to the connected device. In some embodiments, the set of protocols provisioned onto the connected device may be a subset of the protocols identified by the device management module 210 as being relevant to the connected device.

The mobile device 104 may also contain communications interface(s) 218 that enable the mobile device 104 to communicate with a stored database, another computing device or server, one or more terminal devices, connected devices, and/or other electronic devices on a network. The mobile device 104 may also include input/output (I/O) device(s) and/or ports 220, such as for enabling connection with a keyboard, a mouse, a pen, a voice input device, a touch input device, a display, speakers, a printer, etc.

Figure 3:
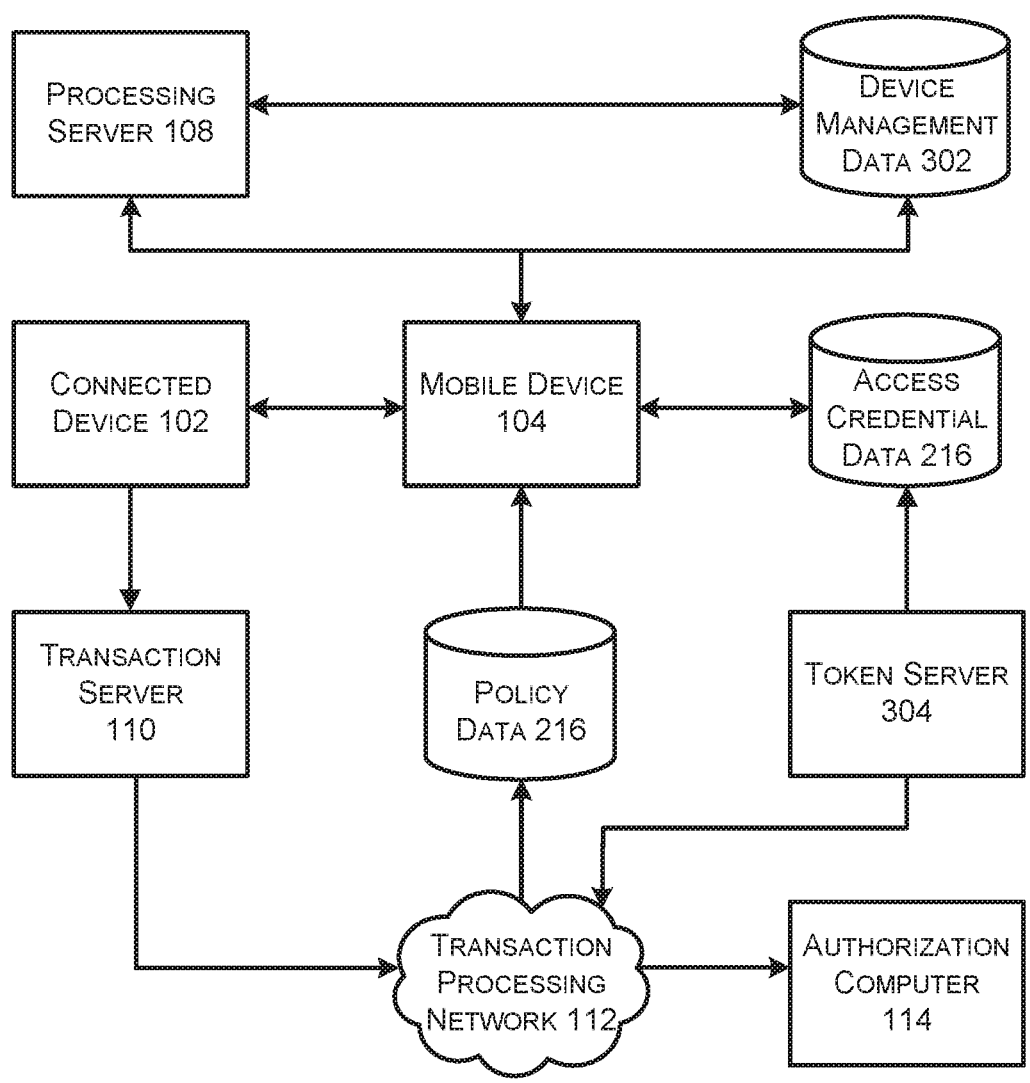
FIG. 3 depicts an example data flow that may be implemented in accordance with at least some embodiments.

FIG. 3 depicts an example data flow that may be implemented in accordance with at least some embodiments. The data flow depicted in FIG. 3, may be implemented at least by the components of the example architecture depicted in FIG. 1.

In some embodiments, a mobile device 104 may receive a request from a connected device 102 to be provided with a subtoken and/or protocol data. For example, upon detecting that one or more predetermined conditions have been met (e.g., that an available amount of a resource has fallen below a threshold level), a connected device 102 may determine that a transaction should be conducted and may transmit a request to the mobile device 104 for a subtoken to be used in the transaction. The conditions may relate to a specific time, date, or status of the connected device. For example, if the connected device 102 is a refrigerator, then a condition may be that the refrigerator has determined that it is out of eggs or milk. It may then request a subtoken so that it may purchase more milk and eggs. In this example, the mobile device 104 may, upon receiving the request, establish a communication session with the connected device 102 to identify a type and/or quantity of resources required by the connected device 102. The mobile device 104 may also identify a type of the connected device 102 related to the request. For example, the request may include a device identifier and the mobile device 104 may query a database of device identifiers (e.g., device management data 302) to determine the identity of (or a type associated with) the connected device 102. In some embodiments, the processing server 108 may identify one or more rules for generating a subtoken associated with a particular connected device from the device management data 214. For example, rules such as constraints on use may be associated with a generated subtoken. As an illustration, if a subtoken is generated for a refrigerator to buy milk and eggs, than a constraint for that subtoken may be that it can only be used at grocery stores. In some embodiments, the mobile device 104 may display the transaction to a user of the mobile device 104 to obtain approval for the transaction. In some embodiments, the transaction may be aggregated with a number of other transactions and presented to a user for approval.

In some embodiments, the mobile device 104 may detect the connected device 102 upon connecting to a private network or entering within range of the connected device 102 (e.g., via a device discovery process). Upon detecting one or more connected devices 102, the mobile device 104 may provide instructions to the connected device 102 to cause it to check the validity of a subtoken currently stored by the connected device 102. For example, the connected device 102 may check a cryptogram associated with the subtoken to determine if it is in fact authentic and operative. In some embodiments, the mobile device 104 may, upon detecting one or more connected devices 102, transmit device identifiers for the connected devices 102 (i.e., any indicator that may be used to identify the connected device) to a processing server 108 which maintains an account associated with a user of the mobile device 104. The processing server 108 may, based on the received identifiers, identify one or more protocols relevant to the connected devices 102 and convey those protocols to the mobile device 104. In some embodiments, the protocols may be stored by the mobile device 104 in a protocol database 216. In some embodiments, the protocol data may include user preference data. For example, the protocol data may include an indication of a user's resource preferences and/or resource replenishment preferences. As an illustration, the protocol data may indicate a preference that the user wishes to use subtokens at particular resource providers (e.g., merchants) or that the user only wishes to use those subtokens during a specified time period (e.g., the first week of each month).

In some embodiments, the mobile device 104 may receive a token (or other suitable access credential) from a token server 304. A token server 304 may be an entity, not necessarily associated with the actual payment entity, that stores and maintains relationships between tokens and actual account numbers used for payment. The mobile device 104, upon receiving connected device information and an indication that a subtoken is to be generated, may generate a subtoken from the received token information (i.e., a parent token). The subtoken may be derived from a parent token, but may be limited in at least one of duration (e.g, it may expire after a period of time or number of uses), the types of transactions that it may be used to conduct, a connected device that may utilize the subtoken (e.g., the subtoken may be associated with the device identifier), or in any other suitable way. Once a subtoken has been generated, it may be provided to the connected device 102 to complete one or more transactions. In addition, the subtoken may be provided to the token server and/or the processing server along with any relevant information (e.g., a device identifier for the connected device, expiration conditions, etc.).

In some embodiments, the connected device 102 may initiate a transaction using the generated subtoken. For example, the connected device 102 may generate a transaction request to obtain a resource that includes the subtoken, an indication of the resource, a quantity of resource to obtain, or any other suitable transaction-related information. The connected device 102 may transmit the generated transaction request to the transaction server 110 via a communication network. The transaction server 110, upon receiving the request, may generate an authorization request to be provided to an authorization computer 114 in order to determine whether to fulfill the transaction request. The authorization request may be provided to the authorization computer 114 via a transaction processing network 112. An exemplary transaction processing network 112 may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The transaction processing network may use any suitable wired or wireless network, including the Internet.

In some embodiments, the authorization request may include a subtoken or other access credential, in which case, the authorization request message may first be provided to the token server 304 to retrieve account information related to the authorization request. The token server 304 may ensure that the subtoken is valid (e.g., unexpired and authorized for use in the transaction). The token server 304 may also determine the parent token, and optionally the real credential associated with the parent token, and may return the same to the transaction processing network 112.

Once the transaction processing network 112 has determined where an authorization request message is to be routed, the transaction processing network 112 may transmit the authorization request message to the appropriate authorization computer 114. If the payment information comprises a subtoken, then the authorization request message may be routed to a token server 304, or the authorization computer 114 may obtain the parent token and/or the real credential from the token server 304. As noted above, the authorization request message may include the parent token or the real account number, and either of these may be routed to the authorization computer 114. If it includes the parent token, then the authorization computer 114 may contact the token server 304 to obtain the real account number.

Once the appropriate authorization computer 114 has received the authorization request message, it may determine if the transaction should be approved. For example, the authorization computer 114 may decline the transaction if there is a high likelihood of fraud. In another example, the authorization computer 114 may decline the transaction if the payment account has insufficient funds. Once the authorization computer 114 has decided whether to approve or decline the transaction, an authorization response message may be returned to the transaction server 110 via the transaction processing network 112. If the real credential or account number was received and used by the authorization computer 114 to authorize the transaction, then the transaction processing network 112 may contact the token server 304 to obtain the parent token and/or subtoken and may include either of these in the authorization response message that is sent back to the transaction server 110.

The transaction server 110 may, upon receiving the response, determine whether the transaction has been approved or declined. The completion of the transaction may be conducted without human intervention. For example, the transaction may be conducted without acquiring authorization from a user or otherwise requiring action on a user's behalf.

In some embodiments, the transaction server 110 may provide an indication of the status of the transaction to the processing server 108. The processing server 108 may update an account associated with a user of the connected device to reflect the transaction status. For example, the processing server 108 may add a receipt to a user's account for the requested resources. In some embodiments, the processing server 108 and/or transaction server 110 may communicate the status of the transaction to the mobile device 104.

In some embodiments, the mobile device 104 may update, upon receiving an indication of the status of the transaction, one or more protocols and/or replenishment conditions stored on the connected device 102. For example, the mobile device 104 may indicate that the resource is currently on order to prevent the connected device from re-ordering the resource. In another example, the mobile device 104 may indicate to the connected device that the subtoken is now invalid upon completion of the transaction.

It should be noted that although the mobile device 104 is depicted as being a separate device from the processing server 108, the two devices may actually be the same device. For example, the mobile device 104 may store a parent token and device protocols to be used in generating a subtoken and/or device-specific protocols.

Figure 4:
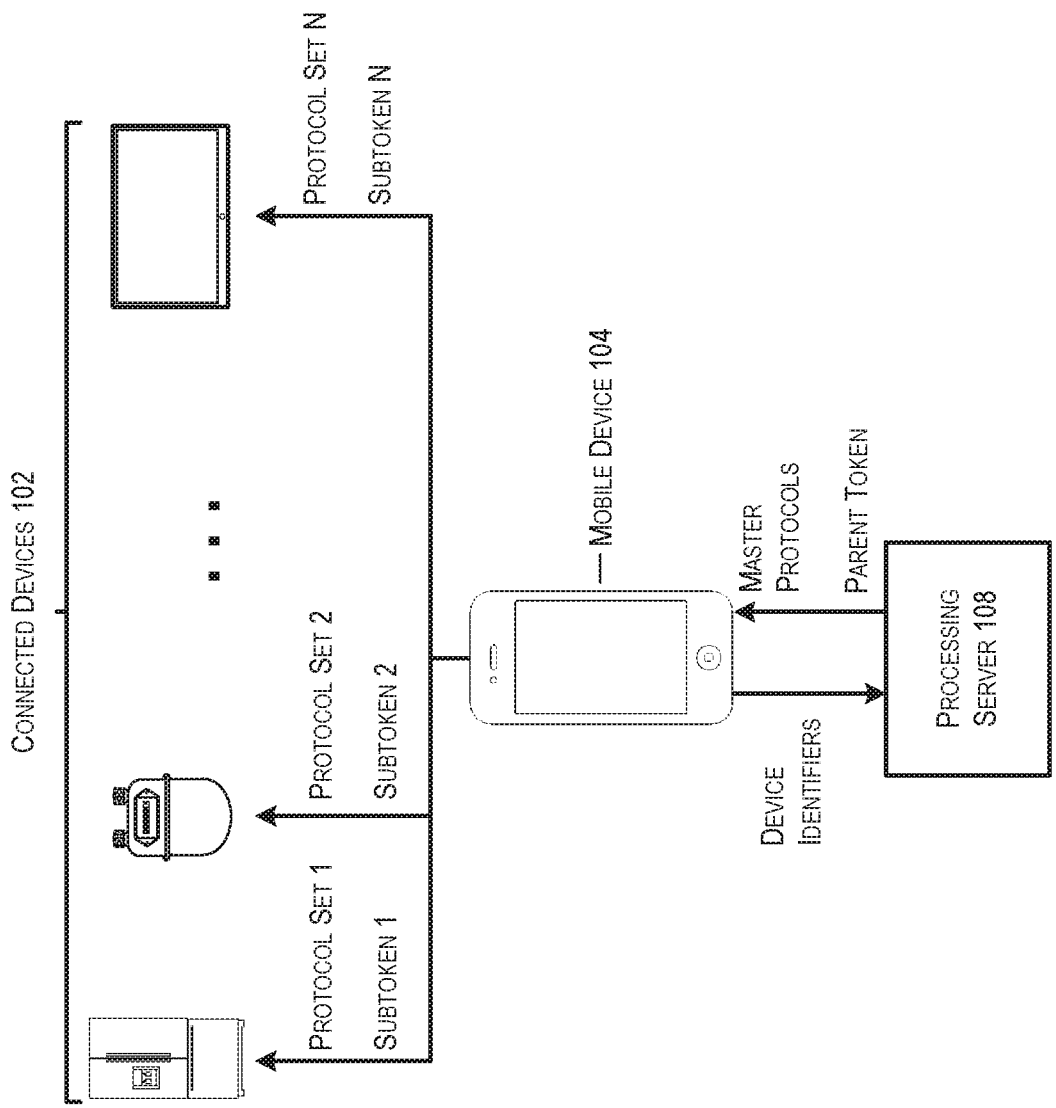
FIG. 4 depicts an illustrative example of a mobile device capable of generating subtokens and protocols to be provided to multiple connected devices in accordance with at least some embodiments.

FIG. 4 depicts an illustrative example of a mobile device capable of generating subtokens and protocols to be provided to multiple connected devices in accordance with at least some embodiments. In FIG. 4, a mobile device 104 may detect multiple connected devices 102.

In some embodiments, the mobile device 104 may identify a type or category associated with each connected device 102 based on a device identifier. This may be accomplished by the mobile device 104 itself, or it may be accomplished by providing the device identifiers to a processing server 108. In some cases, a device identifier may be advertised or otherwise published on a private network. In some cases, the mobile device 104 may connect to each connected device 102 to obtain a device identifier. For each connected device 102 (1 . . . N), a set of master protocols and a parent token may be identified by the processing server 108 and/or the mobile device 104. For example, if a connected device is a refrigerator, then the processing server 108 may identify a set of master protocols relevant to a refrigerator. A set of master protocols may include an indication of a format in which protocols should be provided to the refrigerator, as well as an indication of functionality available from a particular connected device. In some embodiments, the set of master protocols may be provided to the processing server 108 by a manufacturer of the connected device 102. In some embodiments, a separate parent token may be provided to the mobile device 104 for each connected device. In other embodiments, the mobile device 104 may receive a single parent token to be used to generate subtokens for each connected device 102.

The mobile device 104 may cause one or more of connected devices 102 to determine whether a subtoken stored on the device is valid (e.g., not expired or otherwise invalidated). Upon detecting that one or more subtokens is no longer valid, the connected device 102 may submit a request to the mobile device 104 for a new subtoken. In some embodiments, the connected device 102 may transmit information related to one or more transactions to be conducted by the connected device 102. For example, upon detecting that it is the first of the month, a smart gas meter may determine that a transaction should be conducted for the previous month's gas useage. In this example, the smart gas meter may provide information to the mobile device related to the previous month's gas useage with a request for a subtoken to complete the transaction.

In some embodiments, the mobile device 104 may display, or otherwise present, the transaction information to a user of the mobile device. In some embodiments, the mobile device 104 may aggregate a number of transactions provided by multiple connected devices 102. In some embodiments, the mobile device 104 may require authentication by the user before proceeding.

Upon receiving authorization from a user (in embodiments which require authorization to be provided by a user), the mobile device 104 may generate a subtoken from a parent token that the mobile device has stored. A subtoken may be any combination of characters that may be stored in relation to the parent token.

A subtoken is similar to a token, but the subtoken may be associated with one or more limitations. For example, the subtoken may be associated with an expiration date, a maximum number of uses, a type of resource for which it may be used, or any other suitable limitation. Once generated, the subtoken may be provided to the processing server 108 and/or a token server. The subtoken may be provided to the token server along with an indication of the parent token, limitations, a device identifier of the connected device, or any other suitable information. In some embodiments, each connected device 102 (1 ... N) may be provided with a separate subtoken. In some embodiments, a single subtoken may be provided to multiple connected devices 102 (1 ... N).

The mobile device 104 may provide the generated subtoken to the connected device. In some cases, the connected device may be provided with a set of protocols relevant to the connected device 102. For example, the set of protocols may include rules or conditions upon which the connected device may initiate a transaction using the provided subtoken. The connected device 102 may subsequently generate a transaction request that includes the provided subtoken and an indication of the resource to be obtained.

By way of illustrative example, consider a scenario in which the connected device 102 is a smart refrigerator. In this example, the mobile device 104 may connect to a private network to which the smart refrigerator is also connected. Upon connecting to the private network, the mobile device 104 may retrieve a device identifier for the smart refrigerator. Upon providing the device identifier to a processing server, the mobile device 104 may receive a set of master protocols for the smart refrigerator as well as a parent token from the processing server. In some cases, the mobile device 104 may already have a set of protocols and/or parent token stored. The mobile device 104 may also be provided with user preferences related to transactions conducted by the smart refrigerator (e.g., an indication of a transaction server to be used, brand preference information, etc.).

Continuing with the above example, the mobile device 104 may cause the smart refrigerator to determine whether a subtoken currently stored by the refrigerator is expired or otherwise invalid. The smart refrigerator, as well as other connected devices on the private network, may provide information to the mobile device 104 for one or more transactions to be conducted. The mobile device 104 may, upon receiving the transaction information, display the transaction information to a user of the mobile device 104 for authorization.

Upon receiving authorization from a user, the mobile device 104 may generate a subtoken for the smart refrigerator. In some embodiments, the mobile device 104 may identify a parent token that can be used to conduct a transaction, and generate a subtoken from the identified parent token. Upon generating the subtoken, the subtoken may be provided to the smart refrigerator along with a set of protocols relevant to the transaction to be conducted. The mobile device 104 may also provide the subtoken to a token server with an indication that the subtoken may only be used by the refrigerator (e.g., an indication of the device identifier for the refrigerator) and an expiration date. Once the smart refrigerator has received the subtoken, it may conduct a transaction using that subtoken.

Figure 5:
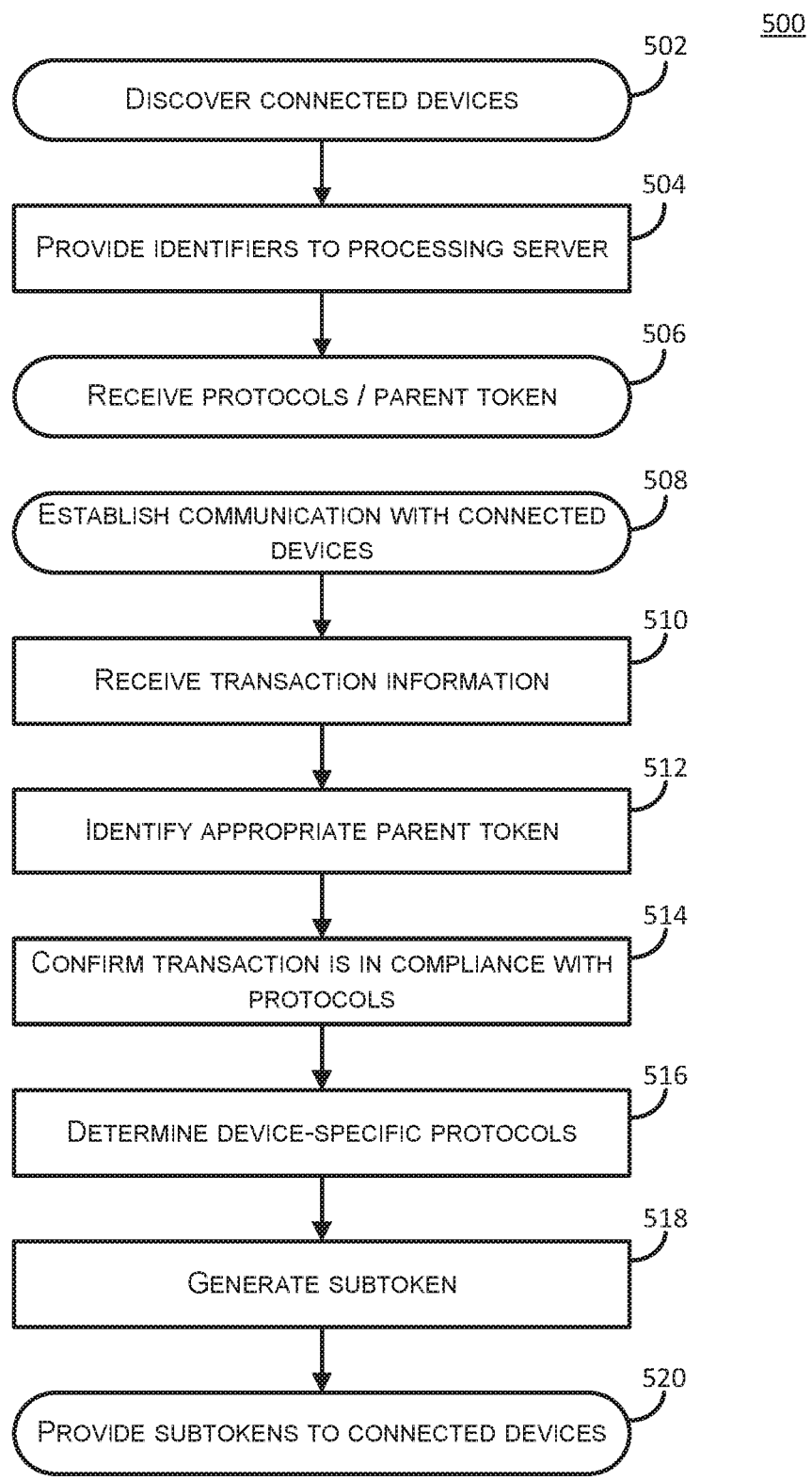
FIG. 5 depicts a flow diagram illustrating a process for discovering one or more connected devices and subsequently providing subtokens in accordance with at least some embodiments.

FIG. 5 depicts a flow diagram illustrating a process for discovering one or more connected devices and subsequently providing subtokens in accordance with at least some embodiments. The first segment on FIG. 5 (502-506) depicts a discovery process for identifying one or more connected devices and receiving information to be used in generating subtokens for those connected devices. The second segment of FIG. 5 (508-520) depicts generation of subtokens/protocols for the discovered connected devices.

Some or all of any of the processes described herein (or variations and/or combinations thereof) may be performed under the control of one or more computer systems configured with executable instructions and may be implemented as code (e.g., executable instructions, one or more computer programs or one or more applications). In accordance with at least one embodiment, the process 500 of FIG. 5 may be performed by at least the mobile device 104 depicted in FIG. 1 and FIG. 2. The code may be stored on a computer-readable storage medium, for example, in the form of a computer program including a plurality of instructions executable by one or more processors. The computer-readable storage medium may be non-transitory.

Process 500 may begin at 502, when device discovery process is initiated by the mobile device. In some embodiments, the device discovery may be initiated by activating a mechanism on the mobile device (e.g., pressing a button located on the mobile device). In some embodiments, the device discovery may be initiated via a user interface. For example, a user may be presented with connected device discovery options on a display of the user device. In some embodiments, the device discovery process may be initiated upon the mobile device connecting to a private network. The device discovery process may involve identifying one or more communicatively connected electronic devices within range of the mobile device using one or more communication means. In some embodiments, a connected device may be connected directly (i.e., hardwired) to the mobile device. In some embodiments, the mobile device may request information on security protocols and/or security certificates from the connected device. In some embodiments, a user may be required to enter a password at the connected device and/or press a button on the connected device to establish that the user is in possession of the connected device.

Upon identifying one or more potential connected devices, the mobile device may be programmed to provide device identifiers for the discovered devices to a processing server at 504. Device identifiers may be published on a private network or they may be requested from each of the discovered connected devices by the mobile device.

Once the mobile device has provided the device identifier to the processing server, the mobile device may receive a set of protocols and/or a parent token at 506. In some embodiments, the mobile device may associate a parent token with each connected device. In some embodiments, the mobile device may maintain a single parent token associated with the mobile device to be used to generate a number of subtokens for each connected device. In some embodiments, upon discovery of a connected device, the mobile device may communicate the device identifier of the connected device to the processing server. The processing server, in turn, may generate a parent token specific to that connected device and may provide the generated parent token to the mobile device to be stored in association with the connected device.

In some embodiments, upon discovery of a connected device, the mobile device may determine that the connected device is currently associated with a subtoken (e.g., the connected device is already associated with a parent token stored on the mobile device). The mobile device may reissue a subtoken to a connected device upon determining that the subtoken currently associated with the connected device should be re-authenticated. For example, the mobile device may, upon discovery of a connected device, determine that the connected device is associated with a subtoken that is expired or is about to expire. In this example, the mobile device may generate a new subtoken from the parent token to be provisioned onto the connected device. Further in this example, the new subtoken may be associated with new expiration conditions (e.g., a new expiration date) that will prolong the subtoken. In some embodiments, the subtoken currently associated with a connected device may be extended by updating expiration conditions associated with the subtoken stored by the processing server. In some embodiments, a mobile device may automatically (e.g., without user intervention) re-authenticate subtokens associated with each connected device in a plurality of connected devices. In some embodiments, upon establishing a connection between a mobile device and a private network, a user of the mobile device may be asked to verify whether one or more subtokens currently associated with the connected device should be re-authenticated.

In some embodiments, the processing server may also identify one or more protocol sets to be associated with the connected device. The protocol sets may be selected based on a type of the connected device, user preferences and/or settings, credit limits, or any other suitable factors. In some embodiments, the processing server may maintain a user account for the user of the connected device. The user may be provided with the capability to log into an account website maintained by the processing server in order to specific one or more user settings to be applied to the connected device. In some embodiments, the user may specify a date upon which a transaction should be initiated, a minimum or maximum currency value to be associated with transactions conducted by the connected device, conditions upon which further user authorization is required, a quantity and/or type of resource to be replenished (in some cases, a particular brand), a merchant from which the resource should be obtained, or any other suitable user preference. Each of these user preferences may be stored as protocol set data. The processing server may, upon receiving a device identifier for a connected device, identify any potentially relevant protocol sets and provide those protocol sets to the mobile device in relation to the connected device. In some embodiments, the mobile device may further communicate at least a subset of the provided protocol set to the connected device. For example, the mobile device may provide an indication of conditions upon which a transaction should be initiated to the connected device.

Once a connected device has been discovered, the mobile device may establish a communication session with the connected device at 508. In some embodiments, the communication session may be established via a private network connection. In some embodiments, the communication session may be established directly with the connected device via a wireless communication mechanism.

Upon detecting that a communication session has been established, the connected device may provider a request to conduct a transaction to the mobile device at 510. The request may include one or more of an indication of at least one resource, a transaction server, a currency amount, or any other suitable transaction-related data. In some embodiments, the request may be encrypted using an encryption key provided to the connected device.

Upon receiving the request, the mobile device may identify an appropriate parent token to be used to generate a subtoken for the requested transaction at 512. In some embodiments, the mobile device may query a data store to identify a parent token associated with the connected device. In some embodiments, the mobile device may utilize single parent token (or set of parent tokens) for each subtoken that it generates on behalf of the identified connected devices.

In some embodiments, the mobile device may confirm that the requested transaction is in compliance with one or more relevant protocols at 514. In some embodiments, the mobile device may identify each of the relevant protocol set data and determine whether any/all conditions have been satisfied. In some embodiments, the mobile device may forward details of the potential transaction to a processing server, which may subsequently determine whether that transaction is in compliance with relevant protocol set data.

In some embodiments, the mobile device may identify a set of device-specific protocols to be provided to the connected device at 516. The set of protocols may include an indication of resources preferred by a user, a brand of the resource, a transaction server from which the resource should be obtained, conditions upon which a transaction for the resource may be conducted, or any other suitable resource-related information. The protocols may be device-specific protocols, in that a set of protocols provided to each connected device is unique to the connected device to which it is provided. In some embodiments, the device-specific protocols may include information related to a subtoken provided to the connected device (e.g., an expiration date of the subtoken, usage limitations, a maximum currency threshold, etc.).

Upon determining that the transaction is in compliance with relevant protocols, the mobile device may generate a subtoken at 518. A subtoken may be associated with an account underlying the parent token, but may be subject to limitations that the parent token is not necessarily subject to. In some embodiments, the limitations may be based on transaction information provided to the mobile device. For example, if a water meter provides transaction information to the mobile device indicating that the previous month's water useage should be paid for, then a subtoken generated by the mobile device may be redeemable only by a water utility company and only within the next 15 days. In another example, a mobile device may receive transaction information from a smart refrigerator indicating a type of food that the refrigerator needs to replenish. In this example, the mobile device may determine, based on user preferences indicated in the set of protocols, that the refrigerator should order the food only from a particular merchant. The mobile device may also determine that the user prefers a particular brand of that type of food. The subtoken generated by the mobile device may be useable only at the specified merchant and only for a specified maximum amount. In addition, the mobile device may provide a set of device-specific protocols to the refrigerator to indicate that the user-preferred brand should be ordered.

In some embodiments, the mobile device may provide the generated subtoken and/or a set of device-specific protocols to a connected device at 520. The connected device may subsequently conduct one or more transactions using the generated subtoken and device-specific protocols.

Figure 6:
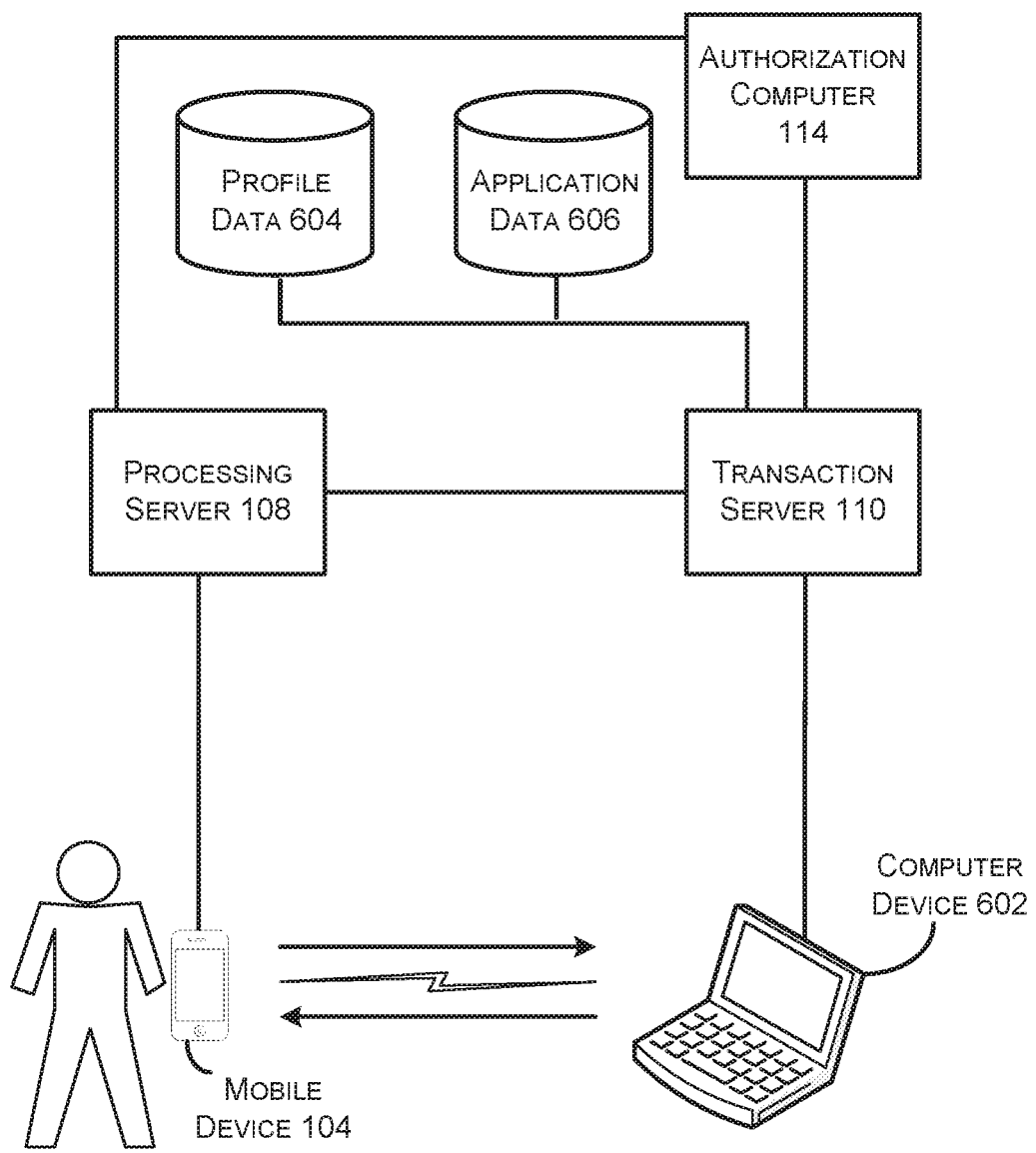
FIG. 6 depicts an exemplary embodiment in which a subtoken is generated for a computer device and used to obtain software and/or software updates.

FIG. 6 depicts an exemplary embodiment in which a subtoken is generated for a computer device and used to obtain software and/or software updates. As depicted in FIG. 6, a user indicate an intent to use the computer device 602 (e.g., the user may attempt to log into the computer device 602). In some embodiments, the user may submit a request to provide the computer device with a specific application or upgrade. The computer device 602 may be an example connected device 102 of FIG. 1. The computer device 602 may, upon receiving an indication that the user wishes to interact with it, establish a communication session with the user's mobile device 104. The computer device 602 may transmit, via the established communication session, a device identifier identifying the computer device 602 to the mobile device 104.

Upon receiving the device identifier from the computer device 102, the mobile device may determine if a request associated with the computer device 102 should be allowed. In some embodiments, the mobile device may confirm with the user that he or she wishes to interact with the computer device 602. Upon determining that the user does wish to interact with the computer, the mobile device may generate a subtoken useable by the computer device 602 to access user-specific data and/or software. The mobile device 104 may transmit the subtoken to the computer device 602. In some embodiments, the mobile device 104 may also transmit the subtoken to a processing server 108 that supports an application on the mobile device 104.

In some embodiments, the requested user interaction may be to use one or more software applications associated with the user. The computer device 602, upon receiving the subtoken, may generate a request for one or more software applications and/or software upgrades to a transaction server 110. The transaction server 110 may confirm the validity of the subtoken with an authorization computer 114 and/or a processing computer 108.

Upon confirming the validity of the subtoken, the transaction server 110 may access profile data 604 associated with the user of the mobile device 104. The profile data 604 may indicate one or more applications stored within an application database 606 that the user has a license to use. (e.g., that the user has rights to). In some embodiments, the subtoken may be associated with a license, such that the receipt of the subtoken results in licensing information being added to the profile of the user. In some embodiments, the subtoken may be a limited-use token, such that it may only be redeemed at a specified number of computing devices 602. Upon identifying one or more applications that the user is authorized to execute, the transaction server 110 may determine whether an application requested by the computer device 602 is among the identified applications. If it is not, then the transaction server 110 may decline the transaction. If the requested application is among those authorized to be used by the user, then the computer device 602 may be given a location of the application in the application data 606 so that the requested application may be downloaded by the computer device.

In some embodiments, the computer device 602 may be provided with, or used to access, one or more applications from the application data 606. In some embodiments, the computer device 602 may be imaged with a user profile for the user upon verification of the subtoken. For example, a number of applications that the user is authorized to access may be made available to the computer device 602 upon the user's login. In some embodiments, the transaction server 110 may be a virtual computing instance (e.g., a cloud computing environment) associated with the user. The computer device 602 may connect to the virtual computing instance upon verification of the subtoken, such that the virtual computing instance is displayed by the computing device 602.

By way of illustrative example, a user may attempt to log into the computer device 602. Upon receiving the login attempt, the computer device 602 may initiate a communication with the user's mobile device. The user may be asked, by the mobile device 104, to verify that he or she is attempting to access the computer device 602. Upon receiving verification from the user, the mobile device 104 may generate a subtoken and provide it to the computer device 602. The computer device 602 may, in turn, transmit the subtoken to the transaction server 110. Upon receiving the subtoken, the transaction server 110 may access a virtual computing instance associated with the user such that the user is able to access one or more applications installed on and executed by the transaction server 110 from the computer device 602.

In another example, the user may have an account with a transaction server 110 that maintains a digital library associated with the user. In this example, the user may access the computer device 602 and request download of a particular software application. In this example, the computer device 602 may initiate a communication with the mobile device 104. The mobile device 104 may communication with the transaction server 110 via the processing server 108 to determine what software licenses the mobile device 104 is associated with. The mobile device 104 may be provided with a list or selection of software applications that may be installed on the computer device 602. In this example, the user may select one or more applications from the list and a subtoken may be generated based on this selection. The subtoken may be provided to the computer device 602, which may subsequently redeem the subtoken with the transaction server 110. In this example, the selected software applications may be provided to the computer device 602.

A computer system can include a plurality of the same components or subsystems, e.g., connected together by external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Embodiments of the invention provide for a number of technical advantages. For example, embodiments of the invention enable connected devices to conduct transactions using subtokens of limited duration. In these embodiments, the subtoken may be invalidated shortly after being used in a transaction, preventing their use by an unauthorized party, even if the subtoken was intercepted in a transaction request. In addition, subtoken information acquired from a connected device that was disposed of may not be used to defraud a previous owner of the connected device, as the token would automatically expire. Additionally, a subtoken may be valid for a specified period of time in which a user of a mobile device may be present. For example, if a user intends to stay in a hotel room for one week, then connected devices in his or her hotel room may be provided with a subtoken and protocols that will automatically expire at the end of the stay. During the stay, the connected devices would conduct transactions in accordance with the user's preferences. The use of subtokens in different connected devices thus increases transaction security, since the validity and policies specifically associated with the use of those subtokens is confined to the functions that the connected devices are intended to perform. In addition, since the subtokens are subordinate to the parent token, all transactions can be recorded against an account associated with a single parent token, thus making it easier for a user to administer. Lastly, because a parent token and subtokens are used, even the unauthorized use of one or more of the subtokens results in limited exposure since those subtokens can only be used in limited circumstances and under specific conditions.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents. For example, although the described embodiments mention the use of subtokens for purchase transactions, subtokens can also be used to access data in remote systems. For example, different connected devices may request software upgrades from a remote computer, but may need to have valid tokens before the upgrades can be obtained.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   connecting, by a mobile device, to a private network;
   identifying, by the mobile device, a plurality of connected devices connected to the private network;
   receiving, from the plurality of connected devices, information related to transactions requested by the plurality of connected devices; and
   in response to receiving the information, providing subtokens to each connected device of the plurality of connected devices associated with the transactions, each of the subtokens being derived from a parent token and being useable to initiate at least one transaction in the transactions, wherein the subtokens are subsequently used by the connected devices to conduct the transactions, wherein the at least one transaction comprises transmitting by the connected device a transaction request message comprising the subtoken to a transaction server which processes the at least one transaction using the subtoken.

2. The method of claim 1, wherein each subtoken is provided to each of the connected devices associated with the at least one transaction upon receiving an indication that the at least one transaction is in compliance with one or more protocols.

3. The method of claim 1 further comprising:
   providing management rules to each of the connected devices associated with the transactions, the management rules comprising instructions for initiating the at least one transaction.

4. The method of claim 1 wherein the information related to transactions requested by the plurality of connected devices comprises an aggregated list of transactions to be conducted by the plurality of connected devices.

5. The method of claim 1 wherein each subtoken is of limited duration.

6. The method of claim 1 further comprising:
authenticating, by the mobile device, each of the plurality of connected devices before providing the subtokens to the connected devices, each of the subtokens including a same number of digits as the parent token.

7. A communication device comprising:
one or more processors; and
a memory including instructions that, when executed by the one or more processors, cause the communication device to:
connect to a private network;
identify a plurality of connected devices in communication with the private network;
receive, from the plurality of connected devices, information related to transactions to be conducted by the plurality of connected devices; and
provide, to each connected device of the plurality of connected devices, a subtoken derived from a parent token useable to initiate at least one transaction in the transactions to be conducted by the plurality of connected devices, wherein the at least one transaction comprises transmitting by the connected device a transaction request message comprising the subtoken to a transaction server which processes the at least one transaction using the subtoken.

8. The communication device of claim 7, wherein the transactions to be conducted by the plurality of connected devices are related to replenishment of a resource managed by a connected device of the plurality of connected devices.

9. The communication device of claim 7, wherein the instructions further cause the communication device to convey the subtoken to the transaction server along with information related to the at least one transaction.

10. The communication device of claim 7, wherein the subtoken derived from the parent token is associated with one or more limitations.

11. The communication device of claim 10, wherein the one or more limitations are associated with the subtoken based on a type of connected device to which it is provided.

12. The communication device of claim 10, wherein the limitations comprise one or more of an expiration date, a maximum number of uses, or a type of resource for which it may be used.

13. The communication device of claim 7, wherein the instructions further cause the communication device to provide a set of protocols to at least one connected device, the set of protocols including protocols for using the subtoken.

14. The communication device of claim 7, wherein providing the subtoken derived from the parent token to each connected device of the plurality of connected devices comprises re-authenticating an existing subtoken for at least one connected device of the plurality of connected devices.

15. A connected device comprising:
one or more processors; and
a memory including instructions that, when executed by the one or more processors, cause the connected device to:
connect to a private network;
establish, via the private network, a communication session with a mobile device;
provide, to the mobile device via the communication session, an indication of at least one transaction to be conducted in relation to a resource managed by the connected device;
receive, from the mobile device via the communication session, a subtoken associated with a parent token and useable to conduct the at least one transaction; and
initiate, using the received subtoken, the at least one transaction, and wherein the parent token is a substitute for a primary account number for a payment account, and wherein the at least one transaction comprises transmitting by the connected device a transaction request message comprising the subtoken to a transaction server which processes the at least one transaction.

16. The connected device of claim 15, wherein the transaction request message includes an indication of the resource.

17. The connected device of claim 16, wherein the instructions further cause the connected device to transmit the transaction request message to a provider of the resource.

18. The connected device of claim 15, wherein the subtoken is configured to be useable only by the connected device.

19. The connected device of claim 15, wherein the instructions further cause the connected device to:
receive a set of protocols from the mobile device; and
ensure that the transaction is in compliance with the set of protocols.

20. The connected device of claim 19, wherein the set of protocols includes an indication of a limitation associated with the subtoken.

21. The connected device of claim 20, wherein the subtoken is used to obtain a software upgrade for the connected device.

* * * * *